Nov. 18, 1941.    W. H. RYAN    2,263,316
SOUND TRACK IN LIGHT-POLARIZING FILM
Filed Sept. 10, 1940    2 Sheets-Sheet 1

INVENTOR
William H. Ryan
BY
Donald C. Brown
ATTORNEY

Nov. 18, 1941.  W. H. RYAN  2,263,316

SOUND TRACK IN LIGHT-POLARIZING FILM

Filed Sept. 10, 1940   2 Sheets-Sheet 2

INVENTOR
William H. Ryan
BY
Donald C. Brown
ATTORNEY

Patented Nov. 18, 1941

2,263,316

UNITED STATES PATENT OFFICE 2,263,316

SOUND TRACK IN LIGHT-POLARIZING FILM

William H. Ryan, Cambridge, Mass., assignor to Polaroid Corporation, Dover, Del., a corporation of Delaware Application September 10, 1940, Serial No. 356,207

18 Claims. (Cl. 88—16.2)

This invention relates to sound production, and more particularly to new means and systems for the reproduction of sound in connection with motion pictures.

It is a particular object of the invention to provide a sound record in the form of a continuous film of light-transmitting material having a sound track reproduced thereon in terms of variation in the light-polarizing properties of the film.

Another object of the invention is to provide, as a new article of manufacture, sound film which is grainless and is accordingly capable of a very high degree of fidelity of reproduction, particularly by reason of its reduction of extraneous noise, and is also capable of a substantially greater maximum density than is obtainable in conventional sound film.

A further object is to provide sound film having a plurality of sound tracks reproduced thereon in superimposed relation, for use in the stereophonic reproduction of sound.

A still further object is to provide, as a new article of manufacture, motion picture sound film comprising stereoscopic motion pictures and stereophonic sound tracks.

Still further objects are to provide novel sound reproducing systems particularly adapted for use in connection with the sound films of this invention.

Other objects and advantages will in part appear and in part be pointed out in the course of the following descriptions of several embodiments of the invention, which are given as non-limiting examples, in connection with the accompanying drawings, in which.

As is stated above, this invention relates particularly to sound film, and by that term is meant both that part of motion picture sound film which bears the sound track and film bearing a sound record thereon without associated pictures. Generally speaking, the principles of sound reproduction by means of such film involve the combination of four essential elements, namely, a light beam, some photoelectric means positioned in the path of said beam, means for varying the intensity of the beam predeterminedly, with respect to both frequency and degree, and reproducing means so coupled with the photoelectric means that variations of the intensity of light incident on the latter will be converted into sound. The means for varying the intensity of the light beam is provided by the film itself, which is moved continuously across the path of the beam and whose structure is such that it transmits a rapidly varying amount of the light therefrom. This variation in the light-transmitting properties of the film may be accomplished in a variety of ways, but it is most commonly accomplished by rendering a continually varying area of the film opaque or by continually varying its density with respect to light transmission. In any case, the pattern produced on the film by the variation in its light-transmitting properties is known as a "sound track," and the frequency and degree of the variation is a function of the frequency and amplitude of the sound represented thereby.

Figure 3:
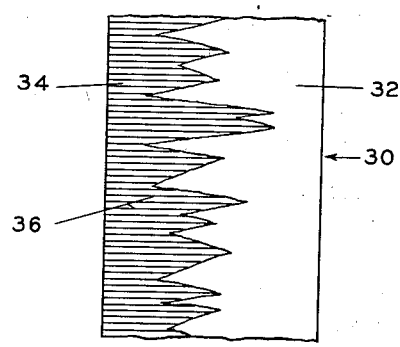
Fig. 3 is a view similar to Fig. 1, showing another type of sound film produced in accordance with the invention.

It is a particular object of this invention to provide sound film whereon the sound track is reproduced in terms of variation in light-polarizing properties of the film, and this variation may, for example, take the form of polarizing and non-polarizing areas varying continually with respect to relative size, or of variation in relative density of polarizing material. Examples of films having these characteristics and produced in accordance with the invention are illustrated in Figs. 1 and 3.

Figure 1:
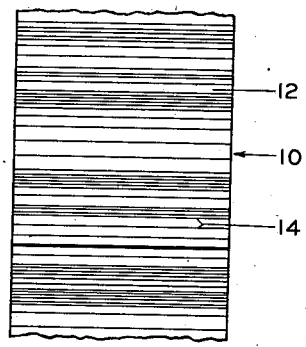
Figure 1 is a diagrammatic representation of one type of sound film produced in accordance with the invention.

Referring first to Fig. 1, film 10 represents a portion of a relatively continuous strip of film of a suitable light-transmitting material, provided with a surface 12 adapted to polarize transmitted light. Said surface may comprise any suitable light-polarizing material such as, for example, a deposit of oriented, light-polarizing crystals on a suitable transparent backing, a suspension of such crystals in a light-transmitting medium, or a transparent plastic having substantially oriented, long chain molecules and treated as by staining to render it light-polarizing. The polarizing axis of surface 12 is represented as being parallel to the series of transverse lines 14. As is indicated by the irregular grouping of said lines, the density of polarizing material per unit area of surface 12 varies throughout the length of the film, and defines a sound track. This variation in the polarizing properties of the film is a function of the frequency and amplitude of the sounds represented thereby and is produced in a manner described hereinafter.

Figure 2:
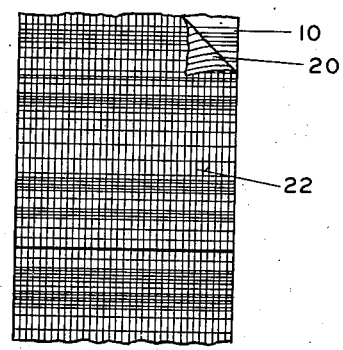
Fig. 2 represents the sound film shown in Fig. 1 when it is viewed through a suitable analyzer.

When film 10 is viewed through a suitable analyzer which is so positioned that its polarizing axis is at right angles to the polarizing axis of the film, the total amount of light transmitted through the combined film and analyzer will vary proportionally with the variation in density of the polarizing material of surface 12. Such an arrangement is shown in Fig. 2, wherein film 10 is represented as having superimposed thereon another film 20 of light-polarizing material having uniform polarization characteristics, as indicated by the series of longitudinal lines 22, and positioned with its polarizing axis, which is assumed to be parallel to lines 22, at right angles to the polarizing axis of surface 12. It will be seen that the combined films appear to comprise a multiplicity of parallel, transverse strips of varying degrees of opacity and varying widths. When such a film is moved continuously across the path of a beam of light, the amount or fraction of the light transmitted thereby will vary both in degree and in frequency of variation. The variation in polarizing properties or density of polarizing material is a function of the frequency and amplitude of the sounds represented thereby.

It will, of course, be apparent that film 10 need not be combined with an additional analyzing film but may be used in combination with separate, stationary analyzing means, as is described hereinafter in connection with Fig. 7.

Referring now to Fig. 3, film 30 represents a portion of a relatively continuous strip of film of a suitable light-transmitting material the surface of which is in part adapted to polarize transmitted light. On this film, however, the polarizing material, which may, for example, comprise any of the materials mentioned above in connection with Fig. 1, is concentrated along only a portion 34 of the surface of the film, and the remaining portion 32 of said surface is represented as non-polarizing. The polarizing properties of area 34 are represented as being substantially uniform, as indicated by the uniform spacing of parallel lines 36, and the polarizing axis of said area may be assumed to be parallel to said lines. It will be noted that polarizing area 34 varies continuously in size, and this variation in polarizing area corresponds functionally with the variation in the density of polarizing material in the case of film 10 in Fig. 1. Similarly, this variation in polarizing area is a function of the frequency and amplitude of the sounds represented by that portion of the sound track defined thereby.

Figure 4:
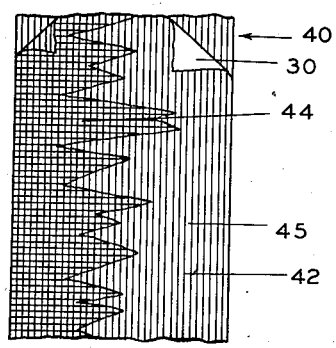
Fig. 4 represents the sound film shown in Fig. 3 when it is viewed through a suitable analyzer.

When film 30 is combined with or viewed through a suitable analyzer, essentially the same result is achieved as in the case of film 10, namely, there is continuous variation in the amount of the light transmitted thereby and in the frequency of this variation. In Fig. 4, film 30 is represented as in superimposed relation with another film 40 of uniformly polarizing material, as indicated by lines 42, with the polarizing axis of said film assumed to be parallel to said lines and at right angles to the polarizing axis of surface area 34. The combined films then comprise an opaque area 44 and a light-transmitting area 45, with the relative sizes of the two areas varying continuously. It will be noted that for the purposes of this invention, the analyzing film may be placed on the side of the sound film toward the light source or on the side away from the light source, or separate analyzing means may be fixed over the light source or over the photo-electric means used in reproduction.

It will be apparent that the operation of the type of sound film shown in Figs. 3 and 4 is essentially the same as that described above in connection with Fig. 2, namely, as the film is moved continuously across the path of a light beam, the continuous variation in the size of its light-transmitting area 45 will result in continuous variation both in the amount or fraction of the light transmitted thereby and in the frequency of that variation.

Films 10 and 30 may be made from a variety of materials, and the sound track may be reproduced thereon in a variety of ways. For example, there may be used a set suspension of substantially oriented, light-polarizing crystals in any suitable light-transmitting medium such as cellulose acetate, a suitable example being polarizing materials of that type made and sold under the trade name "Polaroid." The sound track negative may be prepared initially in any conventional way and then reproduced on the desired film in any suitable way, such, for example, as by treating the film in some way to destroy or otherwise alter the polarizing properties of predetermined areas and in predeterminedly varying degree, corresponding inversely or directly in area or density to the sound track negative, depending on whether a positive or negative print is desired. For example, a gelatin resist may be developed on the film corresponding in thickness or hardness to the density of the sound track negative, and the film then exposed to treatment which will alter its polarizing characteristics in a manner corresponding to the variations in thickness or hardness of the resist. The treatment is essentially the same for the variable area type of sound track except that the resist is of uniform thickness but of varying area.

Another type of material suitable for use in making sound film of the type of films 10 and 30 comprises transparent plastics having substantially oriented, long chain molecules, preferred examples including polyvinyl alcohol, polyvinyl acetal and Cellophane. With such materials the sound track negative may be printed on the film by staining its surface with any suitable dye or stain which renders it light-polarizing, such, for example, as one containing iodine and a periodide. The area and degree of the staining may be conveniently controlled, as with the de-polarizing treatment described above, by first developing on the film a gelatin resist corresponding inversely or directly in thickness or hardness with the density of the sound track negative, depending on whether a positive or negative print is desired. Alternatively, there may first be prepared a gelatin matrix corresponding as above to the sound track negative, and this may be impregnated with the desired stain which may be transferred directly to the film by contact therewith.

In addition to the above described methods, it is possible to reproduce the sound track on the film by the direct action of light. In this process, a sheet or film of the desired material, such, for example, as polyvinyl alcohol having its molecules substantially oriented, is made light-sensitive by treatment with a solution comprising, for example, ammonium bichromate or potassium bichromate, and is then exposed to the action of light through the sound track negative. This results in hardening the film in varying degree where the light is transmitted by the negative, the degree of hardening corresponding to the degree of transmission. The bichromate remaining in the unhardened portions of the film is then washed out and the film subjected to a bath containing an iodide and an acid. The iodide reacts with the dichromate in the hardened areas of the film so as to render these areas light-polarizing and thus reproduce an image of the sound track in polarizing areas.

Under some conditions there are certain advantages to be obtained from the use of the long chain molecule material rather than material of the oriented crystal suspension type. It is possible to orient the surface molecules on each side of a film of a plastic such as polyvinyl alcohol without affecting the molecules in the inner part of the film and one surface may be oriented in a direction at right angles to that of the other. It is therefore possible to reproduce the sound track in polarizing areas on one side of a film and to render the other side uniformly polarizing, thus combining the sound track and its analyzer in a single film. Thus, in Fig. 2, films 10 and 20 may be considered as superimposed surfaces of a single film, the surfaces having their polarizing axes at right angles to each other, and the same is true of films 30 and 40 in Fig. 4.

Regardless of the material used and the process by which the sound track is printed thereon, it will be apparent that the final product of this invention is a light-transmitting film having a surface which is at least partially light-polarizing and whose polarizing effect or properties per unit area thereof vary to a predetermined degree throughout the length of the film, and that this variation in polarizing properties defines a sound track which is a dichroic image of the sound track negative. Such sound films have numerous advantages over conventional types of sound film now in use. A substantial advantage results from the fact that they are grainless in structure and are accordingly capable of reproducing very high frequencies without distortion or extraneous noise such as is caused by the metallic grain present in conventional sound film. Another material advantage is that it is possible with the polarizing materials described herein to produce an image in terms of varying polarizing properties which, when viewed through a suitable crossed analyzer, is capable of having a density substantially higher than conventional sound film, and it is accordingly possible with the film of this invention to achieve a much greater and more accurate range in the intensity of the sounds reproduced. Furthermore, the films of this invention are particularly adapted for use in combination with stereoscopic motion pictures reproduced in terms of varying polarizing properties and are especially advantageous in the stereophonic reproduction of sound, as will be described hereinafter.

Figure 7:
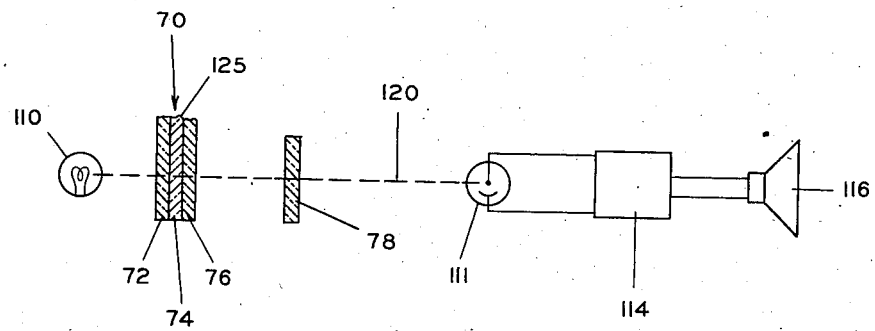
Fig. 7 is a diagrammatic representation of a sound-reproducing system embodying a form of the invention and suitable for use with the type of sound film shown in Figs. 1 and 3.
Figure 8:
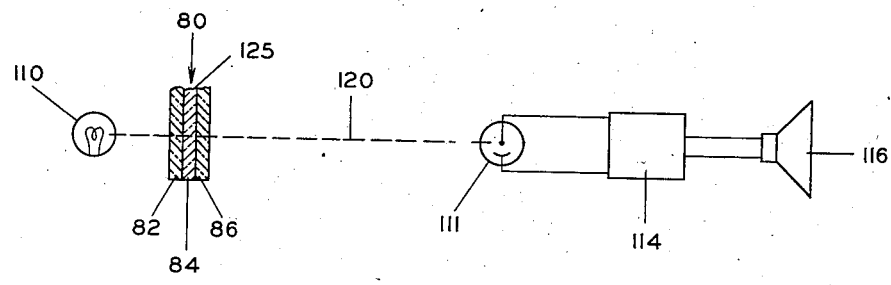
Fig. 8 is a view similar to Fig. 7, showing a modified type of sound-reproducing system embodying another form of the invention and suitable for use with the type of sound film shown in Figs. 2 and 4.

Simple sound-reproducing systems suitable for use with the above described sound films are illustrated somewhat diagrammatically in Figs. 7 and 8. The system shown in Fig. 7 is particularly adapted for use with the films shown in Figs. 1 and 2, and comprises a light source 110, a photo-electric cell 111, an amplifier or similar device 114, and a loud speaker or other reproducer 116. Film 70 in Fig. 7 is considered as moving continuously perpendicularly to the plane of the paper, and any conventional mechanism may be provided for controlling the movement thereof. Film 70 is shown as comprising three layers, a film base 72, a center layer 74 which bears the sound track and corresponds to film 10 and film 30 in Figs. 1 and 3, respectively, and an outer layer 76 of non-polarizing material which serves to protect layer 74. Both layers 72 and 76 may preferably be omitted if layer 74 is of sufficient tensile strength and surface hardness. Between film 70 and photocell 111 is positioned a light-polarizing element 78 so oriented that its polarizing axis is at right angles to the polarizing axis of film layer 74 and hence acting as an analyzer for the polarizing areas thereon. It should be noted, however, that said analyzer may be positioned at any other desired point between light source 110 and photocell 111, for example, directly adjacent said light source.

The operation of the above-described sound-reproducing system will be readily apparent from the drawings. As film 70 moves across the path of light beam 120 incident on photocell 111, the continuous variation in the intensity of said beam produced by the image of the sound track causes continuous variation of the current output of the photocell, and these variations in current are converted into sound waves emitted from speaker 116. The operation is the same whether film layer 74 is of the type shown in Fig. 1 or of the type shown in Fig. 3, inasmuch as the net result of either type of film is to vary the amount of the light transmitted through the film, as described above in connection with Figs. 2 and 4. The frequency of the fluctuations in the light determines the frequency of the sound, and the extent or degree of these fluctuations determines its amplitude or intensity.

The system shown in Fig. 8 is similar to that shown in Fig. 7, except that film 80 is of the type having a superimposed analyzing layer described in connection with Figs. 2 and 4, and hence there is no need for a separate analyzing element such as element 78 in Fig. 7. Film 80 is shown as comprising three layers, film base 82, center layer 84 bearing the sound track, and outer, uniformly polarizing layer 86 serving as analyzer for layer 84 and corresponding to films 20 and 40 in Figs. 2 and 4, respectively. As is pointed out above in connection with Fig. 7, film base layer 82 may be dispensed with under certain conditions. Moreover, layers 84 and 86 may be reversed with respect to their relation to light source 110 and, in the case of material such as polyvinyl alcohol, both layers may be combined into a single film having its two sides serving as superimposed polarizing surfaces with their polarizing axes relatively perpendicular.

In Fig. 8, film 80 is considered as moving perpendicularly to the plane of the paper, and the operation of the system is substantially the same as that of the system shown in Fig. 7 and accordingly need not be described in detail. It will be obvious that Figs. 7 and 8 show only the essential elements of the systems illustrated therein, and that both said systems may be improved in operation by the incorporation therein of suitable lenses, gate elements, and other such conventional devices. It will also be seen that either system may be used advantageously, for example, for transferring a sound record from film to some other medium such as a disk, and that for such use it would be necessary only to substitute another type of reproducing apparatus in place of speaker 116.

One object of this invention is to provide new sound films and sound-reproducing systems for use in the stereophonic reproduction of sound. By "stereophonic" sound-reproducing systems is meant that type wherein the position or direction of the source of the reproduced sound with respect to the auditor corresponds relatively to the position or direction of the original source in recording. In the recording of sound motion pictures, for example, this may be done by the use of two or more sound tracks each recorded from a separate microphone differently positioned with respect to the source of the sound. It will be seen, therefore, that each sound track will be similar, but that they may differ in amplitude or phase of the sounds recorded simultaneously therein, if, for example, one microphone were at a greater distance than another from the source of the sound. It has been proposed to produce stereophonic sound film having a plurality of sound tracks arranged in parallel relation on the same film, but this would require either a wider film or narrower sound tracks than the present standard, either of which is disadvantageous. With the sound film of this invention, however, it is possible to superimpose stereophonic sound tracks of conventional width on the same film, thus producing substantial savings of space or material as well as gaining the other advantages possessed by the sound film of the invention.

An example of such sound film produced in accordance with the invention is shown somewhat diagrammatically in Fig. 5 and comprises a pair of superimposed films 50 and 52, each having reproduced thereon a sound track of the variable area type shown in Fig. 3 and described in connection therewith. The polarizing axis of film 50 is represented as being in the direction indicated by transverse lines 56, and the polarizing axis of film 52 is represented as being at right angles thereto, in the direction indicated by longitudinal lines 58. Either of these polarizing axes may lie in any desired direction as long as the other is substantially perpendicular to it. It may be noted, however, that when such sound film is used in combination with stereoscopic motion pictures, such as shown in Fig. 6 and described hereinafter, the sound track and pictures will preferably be printed on the same film. Such pictures are preferably arranged with their polarizing axes relatively perpendicular and at angles of 45° to the vertical axes of the pictures and to the edges of the film. Sound tracks printed on the same film as the pictures will similarly have their polarizing axes at angles of 45° to the edge of the film.

Figure 5:
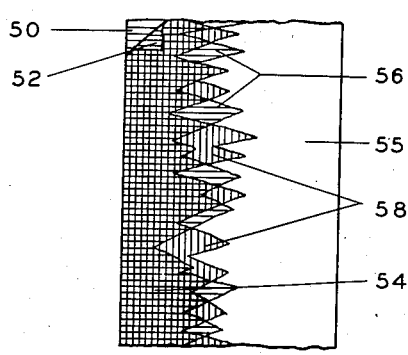
Fig. 5 is a diagrammatic representation of a type of stereoscopic sound film produced in accordance with the invention and generally of the type of film illustrated in Figs. 3 and 4.
Figure 6:
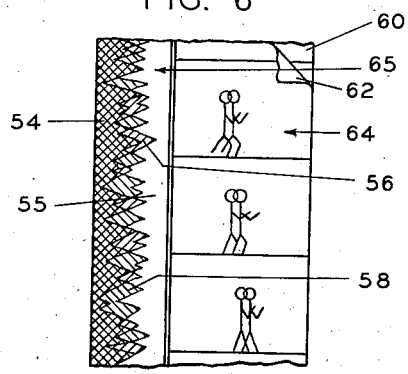
Fig. 6 is a diagrammatic representation of a form of motion picture sound film produced in accordance with the invention and embodying the type of stereophonic sound tracks shown in Fig. 5.

It will be seen from Fig. 5 that when films 50 and 52 are superimposed, the resulting film appears to comprise an opaque area 54 where the polarizing areas of the two films overlap and act to analyze each other, a non-polarizing area 55, and a series of polarizing areas 56 and 58 having their polarizing axes relatively perpendicular, which latter areas represent the differences in phase or amplitude between the two sound tracks. It should be noted, however, that there may be periods when there will be no such differences, and in such cases there will be no such areas 56 and 58. Such portions of the film will have the same appearance as that shown in Fig. 4, with each sound film acting to analyze the other, except that area 45 in Fig. 4 is light-polarizing whereas area 55 has no polarizing properties.

When the film shown in Fig. 5 is viewed through an analyzer having its polarizing axis perpendicular to the polarizing axis of film 50, the result will be the same as if film 52 were removed or not present for, since its polarizing axis is parallel to that of the analyzer, its action is supplemental to that of the analyzer and may be disregarded. Said analyzer will absorb light polarized by film 50, and the image on film 50 will become clearly visible in the same manner as the image on film 30 when viewed as in Fig. 4, with areas 56 appearing to merge with opaque area 54 and similarly appearing opaque.

Conversely, when the combined film is viewed through an analyzer having its polarizing axis perpendicular to the polarizing axis of film 52, the result will be the same as if film 50 were not present, the analyzer will absorb light polarized by film 52, and polarizing areas 58 will appear to merge with opaque area 54 and similarly appear opaque. It follows, therefore, that by the provision of suitable analyzers, either sound track may be caused to register on a photocell for purposes of reproduction independently of the other.

Stereophonic sound film having the above characteristics may be produced in any of the ways described above in connection with Figs. 1 and 3. The films may be made separately, each with its sound track reproduced thereon and then laminated or otherwise joined together, or the sound tracks may be reproduced on each of the superimposed and differently oriented surfaces of a single film of a plastic such as polyvinyl alcohol. Moreover, such film may be made with equally good results in the variable density type such as that shown in Fig. 1 and, when viewed through an analyzer, it functions in the same manner as the film shown in Fig. 5. Similarly, it is equally possible to superimpose film bearing a variable area sound track on a film bearing a variable density sound track, and each will function independently of the other in the manner described above.

Figure 9:
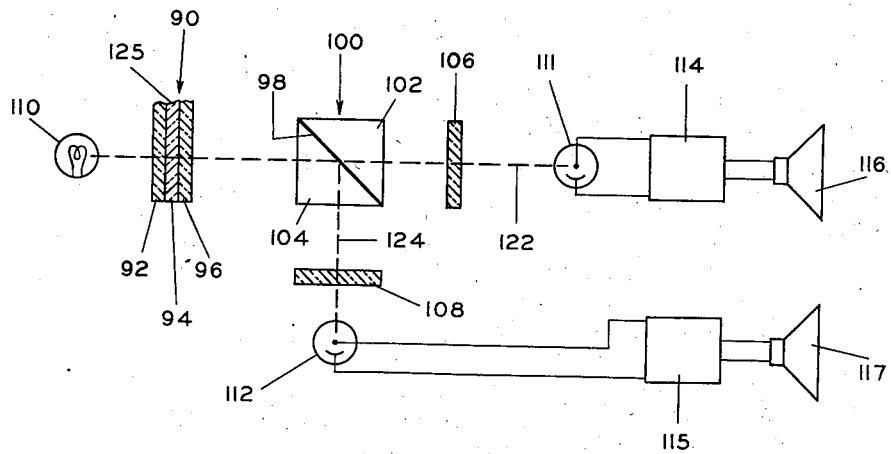
Fig. 9 is a diagrammatic representation of a stereophonic sound-reproducing system embodying still another form of the invention and suitable for use with the sound film shown in Figs. 5 and 6.

A stereophonic sound-reproducing system suitable for use in connection with the above-described stereophonic sound film is illustrated somewhat diagrammatically in Fig. 9. It includes a light source 110, a photocell 111, an amplifier 114, and a speaker 116, and has, in addition, a second photocell 112 with associated amplifier 115 and speaker 117. It is to be understood that there are also provided any suitable conventional means for continually moving film 90 across the path of light beam 120, which motion is considered as being perpendicular to the plane of the paper in Fig. 9. Film 90 is shown as comprising three layers, film base 92, which may be omitted under certain conditions, as explained above in connection with Figs. 7 and 8, layer 94 corresponding to film 52 in Fig. 5, and layer 96, corresponding to film 50 in Fig. 5. As explained above, layers 94 and 96 may be combined into superimposed surfaces of a single film. Suitable means 100 are provided for separating beam 120 into a pair of substantially equal component beams 122 and 124. Said means may comprise, for example, a half-silvered surface 98 between a pair of glass prisms 102 and 104 or a half-silvered plate of glass 98. Positioned in the path of light beam 122 is an analyzer 106 of uniform polarization characteristics, which is so oriented that its polarizing axis is at right angles to the polarizing axis of one of said film layers, for example layer 94, and positioned in the path of light beam 124 is a similar analyzer 108, which is so oriented that its polarizing axis is at right angles to the polarizing axis of the other of said layers, in this case layer 96. Mirror surface 98 is preferably so oriented that it is parallel and perpendicular, respectively, to the planes of vibration of the polarizing components of beam 120, in order to avoid introducing elliptically polarized light into the system. In case some other orientation of the mirror is desired, there may have to be provided suitable fractional wave retardation elements between said mirror and said analyzers to compensate for the ellipticity of polarization of the light reflected by the mirror.

It is believed that the operation of this reproducing system will now be clear. In passing through moving film 90, light beam 120 is partially polarized in opposite planes by the polarizing areas of the two sound film layers. At the same time, part of the light polarized by the layer adjacent the light source will be absorbed by the other layer at the areas where their polarizing portions overlap, for example, the area 54 in Fig. 5. If the film is of the variable area type, part of beam 120, namely that portion incident on the area corresponding to area 55 in Fig. 5, will remain unpolarized, but if the film is of the variable density type, substantially all of beam 120 will be at least partially polarized. Beam separator 100 preferably transmits approximately half of the light of beam 120 as beam 122 and reflects the remaining half at an angle as beam 124, each of said resulting component beams having substantially the same polarization characteristics as the original beam 120.

For the purposes of explanation, it may be assumed that layer 94 polarizes light to vibrate in a vertical plane, and film layer 96 polarizes in a horizontal plane. In this case, analyzer 106 will be oriented with its transmission axis horizontal, and it will absorb all the light incident thereon which was vertically polarized by film layer 94, although, as pointed out above, some of this light has already been absorbed by layer 96. Since film layer 96 polarizes in the horizontal plane, the light polarized by it will be freely transmitted by analyzer 106, as explained above. Accordingly, the light transmitted by analyzer 106 and incident on photocell 111 will comprise only that light not polarized by film layer 94, and its intensity will fluctuate directly responsively to the variation in the polarizing properties of film layer 94 which, as explained above in connection with Fig. 7, will cause the current output of cell 111 to fluctuate similarly, and these latter fluctuations in turn will be converted into sound waves emitted from speaker 116.

The operation of the other side of the reproducing system is the converse of that described above. Analyzer 108 is oriented with its transmission axis vertical and so acts to absorb that component of beam 124 which was horizontally polarized by film layer 96 and to transmit vertically polarized light. Accordingly, photocell 112 is able to view the sound track on layer 96 as if layer 94 were not present, the light transmitted by analyzer 108 and incident on photocell 112 will comprise only the light neither polarized nor absorbed by film layer 96, and its intensity will fluctuate according to the variations in the polarizing properties of film layer 96, thus in turn actuating cell 112 and speaker 117. It will be seen, therefore, that in the operation of the above-described system, each speaker device reproduces the sound record on one of the film layers in the sound film without regard to the record on the other film layer or surface.

It will be understood that in accordance with the principles of stereophonic sound reproduction, speakers 116 and 117 in the above described system are preferably positioned with respect to each other and the auditor in a manner corresponding to the relative arrangement of the microphones from which the original sound records were made.

It will also be understood that many modifications may be made of the above system without departing from within the scope of the invention. For example, in place of the illustrated beam-separating device 100, there may be substituted some means which will divide the beam into the two components vibrating at right angles to each other, for example, a double image prism or a Nicols prism modified to permit the emergence of the separated or refracted component, and prisms 102 and 104 may be considered as representing such a device. Since any of such devices will also act as analyzers for the sound tracks, the illustrated analyzers 106 and 108 may be omitted.

In another modification, there may be provided separate light sources and gates for each photocell, in which case it would merely be necessary to print the sound tracks in superimposed relation but with one track longitudinally offset from the other by the distance between said separate gates. Many other modifications will doubtless be apparent to one skilled in the art and must be construed as being within the scope of this invention and of the claims herein.

One of the objects of the invention mentioned above is the provision of stereophonic sound film in combination with stereoscopic motion pictures, and an example of such film is shown somewhat diagrammatically in Fig. 6. It is illustrated as comprising a pair of laminated films 60 and 62, but it will be understood that these layers may be combined into the superimposed surfaces of a plastic such as polyvinyl alcohol whose surface molecules may be oriented in different directions on each side. It will be seen that the film shown in Fig. 6 may be considered as being divided into longitudinal strips, strip 64 comprising a series of superimposed, dichroic, stereoscopic images together defining a three-dimensional motion picture, and strip 65 comprising stereophonic sound tracks. Sound tracks 65 are of the variable area type shown in Fig. 5 and will be seen to comprise substantially the same opaque area 54, non-polarizing area 55 and series of polarizing areas 56 and 58 having their polarizing axes at right angles to each other. It will be noted that, as explained above in connection with Fig. 5, the polarizing axes of said layers are represented as being at angles of 45° to the edges of the film. Sound tracks 65 may be of either the variable area or variable density type and may be produced in any of the ways described above in connection with Fig. 5.

The operation of sound tracks 65 is precisely the same as that of stereophonic sound film 90 described above in connection with Fig. 9. It should be pointed out, however, that it is not essential to the present invention that the precise combination shown in Fig. 6 be used. On the contrary, many modifications and variations of this combination are proposed. For example, any of the sound films shown in Figs. 1–5 may be combined with two-dimensional or three-dimensional motion pictures, as indicated by broken edge 125 of films 70, 80 and 90 in Figs. 7, 8 and 9, respectively. The sound tracks of this invention may similarly be combined with conventional photographic motion pictures not formed in polarizing areas, and many similar combinations will be apparent to one skilled in the art and are to be considered as falling within the scope of this invention and of the claims herein.

Since certain changes may be made in the above product and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A sound record comprising a film of light-transmitting material adapted to polarize at least a predetermined portion of transmitted light, the polarizing properties of said film varying predeterminedly along the length thereof as a function of the frequency and amplitude of the sound represented thereby.

2. A sound record comprising a light-transmitting film, adjacent areas thereof being adapted to polarize transmitted light to a predeterminedly varying degree, said variation in the polarizing properties of said film defining a sound track and being a function of the frequency and amplitude of the sounds represented thereby.

3. A sound record comprising a film of light-transmitting material, an area of said film of predeterminedly varying width being adapted to polarize transmitted light, said variation in width of said polarizing area being a function of the frequency and amplitude of the sounds represented thereby.

4. A sound record comprising a light-transmitting film adapted to polarize transmitted light, the density of the polarizing material of said film for the absorbed component of transmitted light varying predeterminedly as a function of the frequency and amplitude of the sounds represented thereby.

5. A sound record comprising a film of light-transmitting material adapted to polarize at least a predetermined portion of transmitted light, the polarizing properties of said film varying predeterminedly along the length thereof as a function of the frequency and amplitude of the sound represented thereby, said film being characterized by the fact that it is grainless in structure.

6. A sound record comprising a light-transmitting film, adjacent areas thereof being adapted to polarize transmitted light to a predeterminedly varying degree, said variation in the polarizing properties of said film defining a sound track and being a function of the frequency and amplitude of the sounds represented thereby, said film being characterized by the fact that it is grainless in structure.

7. A sound record comprising a film of light-transmitting material, at least one surface of said film being partially light-polarizing, the concentration of the polarizing material in said surface varying predeterminedly throughout the length of said film and defining a sound track.

8. A sound record comprising a film of light-transmitting material, at least one surface of said film being partially light-polarizing, the polarizing properties of said surface varying predeterminedly throughout the length of said film and defining a sound track.

9. A sound record comprising a plurality of superimposed light-transmitting films, one of said films comprising material adapted to polarize transmitted light, the polarizing properties of said film varying predeterminedly throughout the length thereof and defining a sound track, and another of said films comprising substantially uniformly light-polarizing material, the polarizing axes of said films being at right angles to each other.

10. A sound record comprising a plurality of superimposed surfaces forming a light-transmitting film, each of said surfaces comprising light-polarizing material, the polarizing axes of said surfaces being at right angles to each other, the polarizing properties of at least one of said surfaces varying predeterminedly throughout the length of said film and defining a sound track.

11. A stereophonic sound record comprising a plurality of superimposed surfaces forming a light-transmitting film, each of said surfaces comprising light-polarizing material, the polarizing axes of said surfaces being at right angles to each other, the polarizing properties of one of said surfaces varying predeterminedly throughout the length of said film and defining a sound track, and the polarizing properties of the other said surface varying predeterminedly throughout the length of said film and defining a second sound track.

12. As a new article of manufacture, motion picture sound film composed of a light-transmitting film comprising a plurality of longitudinal strips, one of said strips bearing thereon a plurality of images together defining a motion picture, and another of said strips being adapted to polarize transmitted light, the polarizing properties of said strip varying predeterminedly throughout the length of said film and defining a sound track.

13. As a new article of manufacture, motion picture sound film comprising, in combination, means providing a plurality of superimposed, dichroic, stereoscopic images together defining a three-dimensional motion picture, and further means providing a second plurality of superimposed, dichroic images together defining stereophonic sound tracks.

14. As a new article of manufacture, motion picture sound film comprising a plurality of superimposed surfaces each comprising light-polarizing material, the polarizing axes of said surfaces being at right angles to each other, each of said surfaces being composed of a plurality of adjacent, longitudinal strips, one superimposed set of said strips having thereon means providing a series of superimposed, dichroic, stereoscopic images together defining a three-dimensional motion picture, and another superimposed set of said strips having thereon means providing a plurality of superimposed, dichroic images together defining stereophonic sound tracks.

15. In a sound-reproducing system including a source of light and reproducing means sensitive to variations in the intensity of a beam emanating from said source, the combination comprising a film of light-transmitting material, means providing a dichroic image thereon defining a sound track, means for moving said film continuously across the path of said beam, and analyzing means positioned between said light source and said sensitive means and comprising light-polarizing material so oriented that its polarizing axis is at right angles to the polarizing axis of said sound track.

16. A sound-reproducing system comprising, in combination, a source of light, means sensitive to variations in the intensity of incident light positioned in the path of a beam emanating from said source, reproducing means associated with said sensitive means and responsive to activation thereof, a light-transmitting film mounted for movement across the path of said beam and having at least one surface comprising light-polarizing material, the polarizing properties of said surface varying predeterminedly throughout the length of said film and defining a sound track, and analyzing means positioned between said light source and said sensitive means and comprising light-polarizing material so oriented that its polarizing axis is at right angles to the polarizing axis of said film.

17. A sound-reproducing system comprising, in combination, a source of light, photoelectric means positioned in the path of a beam emanating from said source, reproducing means coupled to said photoelectric means, a light-transmitting film mounted for movement across the path of said beam and comprising a plurality of superimposed surfaces each comprising light-polarizing material, the polarizing axes of said surfaces being at right angles to each other, the polarizing properties of at least one of said surfaces varying predeterminedly throughout the length of said film and defining a sound track.

18. A stereophonic sound-reproducing system comprising, in combination, means for projecting a beam of light, a light-transmitting film mounted for movement across the path of said beam adjacent the source thereof and comprising a plurality of superimposed surfaces each comprising light-polarizing material, the polarizing axes of said surfaces being at right angles to each other, the polarizing properties of each of said surfaces varying predeterminedly throughout the length of said film and defining superimposed sound tracks, analyzing means positioned in the path of the beam emerging from said film and comprising means for separating said beam into a plurality of component beams vibrating in planes perpendicular to each other, photoelectric means positioned in the path of each of said component beams, and reproducing means coupled to each of said photoelectric means.

WILLIAM H. RYAN.